US012603540B2

(12) United States Patent
Jin et al.

(10) Patent No.: US 12,603,540 B2
(45) Date of Patent: Apr. 14, 2026

(54) ROTARY ELECTRIC MACHINE, WITH FLUID DISTRIBUTION CHAMBER BETWEEN STATOR AND HOUSING

(71) Applicant: VALEO POWERTRAIN (NANJING) CO., LTD., Nanjing (CN)

(72) Inventors: Yejin Jin, Shanghai (CN); Kai Chen, Shanghai (CN); Guoqiang Sun, Shanghai (CN)

(73) Assignee: VALEO POWERTRAIN (NANJING) CO., LTD., Nanjing (CN)

( * ) Notice: Subject to any disclaimer, the term of this patent is extended or adjusted under 35 U.S.C. 154(b) by 237 days.

(21) Appl. No.: 18/044,282

(22) PCT Filed: Sep. 1, 2021

(86) PCT No.: PCT/CN2021/115996
§ 371 (c)(1),
(2) Date: Mar. 7, 2023

(87) PCT Pub. No.: WO2022/052848
PCT Pub. Date: Mar. 17, 2022

(65) Prior Publication Data
US 2023/0336049 A1 Oct. 19, 2023

(30) Foreign Application Priority Data
Sep. 11, 2020 (CN) .......................... 202010953306.4

(51) Int. Cl.
*H02K 5/20* (2006.01)
*H02K 9/19* (2006.01)

(52) U.S. Cl.
CPC .............. *H02K 5/203* (2021.01); *H02K 9/19* (2013.01)

(58) Field of Classification Search
CPC .. H02K 9/00; H02K 9/08; H02K 9/12; H02K 9/14; H02K 9/16; H02K 9/193; H02K 9/19; H02K 9/197; H02K 5/20
(Continued)

(56) References Cited

U.S. PATENT DOCUMENTS 2,862,120 A * 11/1958 Onsrud .................. H02K 5/203
165/47
3,075,103 A * 1/1963 Ward, Jr. ............... H02K 9/227
310/260
(Continued)

FOREIGN PATENT DOCUMENTS

CN 101079566 A 11/2007
CN 107276266 A 10/2017
(Continued)

OTHER PUBLICATIONS

International Search Report Issued Jan. 4, 2022, in PCT/CN2021/115996, filed on Sep. 1, 2021, 2 pages.

*Primary Examiner* — Maged M Almawri
(74) *Attorney, Agent, or Firm* — Oblon, McClelland, Maier & Neustadt, L.L.P.

(57) ABSTRACT
A rotary electric machine includes a rotor configured for coupling with a rotary shaft and a stator configured for surrounding the rotor, the stator includes a stator body and stator end windings which extend from axial ends of the stator body. The rotary electric machine further includes a housing configured for receiving the stator and rotor, the housing includes a fluid distributing chamber provided along an inner surface of the housing for being communicated with a plurality of fluid channels so as to distribute the fluid to flow through outer surfaces of the stator body and stator end windings when the stator is inserted into the housing. The present disclosure further relates to a pow- (Continued)

ertrain assembly and an electrified vehicle including the rotary electric machine.

11 Claims, 4 Drawing Sheets

(58) Field of Classification Search
USPC ....................................................... 310/52–64
See application file for complete search history.

(56) References Cited

U.S. PATENT DOCUMENTS

| | | | | |
|---|---|---|---|---|
| 3,109,947 | A * | 11/1963 | Thompson | H02K 9/00 310/260 |
| 3,521,094 | A * | 7/1970 | Widder | H02K 9/197 310/58 |
| 3,681,628 | A * | 8/1972 | Krastchew | H02K 9/00 310/52 |
| 3,863,083 | A * | 1/1975 | Jaeschke | H02K 9/197 310/58 |
| 3,978,359 | A * | 8/1976 | Kultzow | H02K 3/505 310/260 |
| 4,276,747 | A * | 7/1981 | Faldella | F01K 25/06 60/676 |
| 4,285,107 | A * | 8/1981 | Kusters | F16C 13/00 29/895.212 |
| 4,323,803 | A * | 4/1982 | Danko | H02K 9/10 165/104.19 |
| 4,346,361 | A * | 8/1982 | Sauer | H01F 27/322 336/60 |
| 4,382,585 | A * | 5/1983 | Fischer | C21B 7/10 266/190 |
| 4,406,610 | A * | 9/1983 | Duijvestijn | F23D 14/20 239/404 |
| 4,412,515 | A * | 11/1983 | Fritzenwenger | F02B 61/02 123/198 C |
| 4,470,950 | A * | 9/1984 | Hyde | G21F 5/008 976/DIG. 344 |
| 4,499,926 | A * | 2/1985 | Friberg | H01B 9/001 138/123 |
| 4,530,315 | A * | 7/1985 | Mezger | F02B 75/22 123/41.74 |
| 4,553,585 | A * | 11/1985 | Pfleger | F01P 11/08 165/145 |
| 4,587,659 | A * | 5/1986 | Ungar | F27D 11/10 373/69 |
| 4,616,484 | A * | 10/1986 | Mehdi | F25B 41/20 62/243 |
| 4,629,397 | A * | 12/1986 | Schweitzer | F01D 5/284 416/241 B |
| 4,790,721 | A * | 12/1988 | Morris | F01D 5/284 416/241 B |
| 4,933,593 | A * | 6/1990 | Gerritsen | H01J 29/006 348/832 |
| 5,209,283 | A * | 5/1993 | Miltzow | B22D 11/1287 492/46 |
| 5,293,089 | A * | 3/1994 | Frister | H02K 5/203 310/64 |
| 5,494,424 | A * | 2/1996 | Schnell | F04C 29/04 418/83 |
| 5,551,382 | A * | 9/1996 | Bauer | F02F 1/40 123/193.5 |
| 5,616,973 | A * | 4/1997 | Khazanov | F04D 29/5806 310/58 |
| 5,664,916 | A * | 9/1997 | Link | B23Q 1/70 310/58 |
| 5,682,292 | A * | 10/1997 | Salanki | H01F 27/2876 336/62 |
| 5,758,718 | A * | 6/1998 | de Lazzer | F28D 9/00 165/149 |
| 5,774,517 | A * | 6/1998 | Palavecino | G21C 15/02 376/377 |
| 5,915,346 | A * | 6/1999 | Rehr | F02F 1/14 123/41.82 R |
| 6,047,895 | A * | 4/2000 | Pastleitner | F01P 7/14 236/34.5 |
| 6,167,847 | B1 * | 1/2001 | Ergezen | F02F 1/16 123/41.79 |
| 6,257,326 | B1 * | 7/2001 | Heinrich | C21B 7/10 165/169 |
| 6,300,693 | B1 * | 10/2001 | Poag | H02K 5/203 310/58 |
| 6,445,094 | B1 * | 9/2002 | Lonardi | H02K 5/203 212/331 |
| 6,800,971 | B1 * | 10/2004 | Mangold | F02N 11/04 310/58 |
| 6,815,848 | B1 * | 11/2004 | Glew | H02K 5/207 310/58 |
| 6,900,561 | B2 * | 5/2005 | Vlemmings | H02K 5/203 310/58 |
| 6,909,210 | B1 * | 6/2005 | Bostwick | H02K 5/203 310/58 |
| 7,009,317 | B2 * | 3/2006 | Cronin | H02K 5/203 310/52 |
| 7,314,037 | B2 * | 1/2008 | Roithinger | F01L 13/06 123/41.31 |
| 7,550,882 | B2 * | 6/2009 | Verhaegen | H02K 3/24 310/58 |
| 7,589,441 | B2 * | 9/2009 | Kalsi | H02K 1/12 310/180 |
| 7,675,209 | B2 * | 3/2010 | Masoudipour | H02K 5/203 310/89 |
| 7,705,496 | B2 * | 4/2010 | Zisler | H02K 9/14 310/58 |
| 7,992,535 | B2 * | 8/2011 | Steiner | F02B 39/14 123/196 AB |
| 8,061,131 | B2 * | 11/2011 | Kuhlbach | F02B 75/18 123/193.5 |
| 8,110,960 | B2 * | 2/2012 | Bischof | H02K 3/47 310/227 |
| 8,146,543 | B2 * | 4/2012 | Kuhlbach | F02F 1/243 123/193.5 |
| 8,161,643 | B2 * | 4/2012 | Smith | H02K 5/203 29/890.03 |
| 8,247,933 | B2 * | 8/2012 | Dang | H02K 1/20 310/59 |
| 8,378,550 | B2 * | 2/2013 | Bradfield | H02K 9/00 310/58 |
| 8,621,865 | B2 * | 1/2014 | Mehring | F01P 3/12 60/605.3 |
| 8,857,386 | B2 * | 10/2014 | Kuhlbach | F02F 1/243 60/599 |
| 8,894,921 | B2 * | 11/2014 | Wedde | F28F 9/182 165/104.19 |
| 9,287,747 | B2 * | 3/2016 | Balzer | H02K 9/10 |
| 11,770,041 | B2 * | 9/2023 | Ziskovsky | H02K 5/203 310/54 |
| 11,876,433 | B2 * | 1/2024 | Ishikawa | H02K 7/116 |
| 12,062,971 | B2 * | 8/2024 | Kiyooka | H02K 9/19 |
| 2002/0024262 | A1 * | 2/2002 | Hayase | H01F 27/10 310/59 |
| 2004/0012272 | A1 * | 1/2004 | Houle | H02K 5/203 310/54 |
| 2005/0145205 | A1 * | 7/2005 | Haubner | F02F 1/4214 123/41.31 |
| 2005/0189095 | A1 * | 9/2005 | Damsohn | F28F 1/04 165/148 |
| 2005/0268464 | A1 * | 12/2005 | Burjes | F28F 3/12 29/890.035 |
| 2006/0054112 | A1 * | 3/2006 | Paul | F02F 1/40 123/41.82 R |
| 2009/0026858 | A1 * | 1/2009 | Knauff | H02K 1/20 310/59 |
| 2009/0261668 | A1 * | 10/2009 | Mantere | H02K 5/203 310/54 |
| 2010/0007227 | A1 * | 1/2010 | Smith | H02K 5/203 310/64 |

(56)                    References Cited

U.S. PATENT DOCUMENTS

| | | | | |
|---|---|---|---|---|
| 2010/0194233 A1* | 8/2010 | Wu | H02K 3/47 | 310/214 |
| 2011/0109095 A1* | 5/2011 | Stiesdal | F03D 9/25 | 290/55 |
| 2011/0133580 A1* | 6/2011 | Sugimoto | H02K 1/20 | 310/54 |
| 2011/0168356 A1* | 7/2011 | Knight | H02K 11/33 | 165/104.19 |
| 2011/0234029 A1* | 9/2011 | Pal | H02K 9/197 | 310/54 |
| 2011/0278968 A1* | 11/2011 | Houle | H02K 1/20 | 310/54 |
| 2012/0025638 A1* | 2/2012 | Palafox | H02K 9/10 | 310/52 |
| 2012/0074799 A1* | 3/2012 | Bradfield | H02K 1/185 | 310/58 |
| 2012/0217826 A1* | 8/2012 | Jiang | H02K 5/203 | 165/170 |
| 2013/0126143 A1* | 5/2013 | Sheu | F28F 1/00 | 165/177 |
| 2013/0234543 A1* | 9/2013 | Buttner | B60L 3/0061 | 310/54 |
| 2014/0069099 A1* | 3/2014 | Rohwer | B60L 3/0061 | 903/902 |
| 2015/0130302 A1* | 5/2015 | Leberle | H02K 9/197 | 310/54 |
| 2020/0244143 A1* | 7/2020 | Kiyooka | B60K 1/00 | |
| 2022/0329117 A1* | 10/2022 | Yu | H02K 1/20 | |

FOREIGN PATENT DOCUMENTS

| | | | | |
|---|---|---|---|---|
| CN | 109756056 A | 5/2019 | | |
| CN | 209545273 U | 10/2019 | | |
| CN | 210957944 U | 7/2020 | | |
| CN | 211127407 U | 7/2020 | | |
| CN | 111509876 A | 8/2020 | | |
| EP | 2 804 291 A1 | 11/2014 | | |
| FR | 3 093 389 A1 | 9/2004 | | |
| WO | WO-2020174184 A1 * | 9/2020 | | H02K 5/20 |

* cited by examiner

100

19

20

X

10

21  26

ROTARY ELECTRIC MACHINE, WITH FLUID DISTRIBUTION CHAMBER BETWEEN STATOR AND HOUSING

FIELD OF THE INVENTION

Embodiments of the present disclosure relate generally to a rotary electric machine, a powertrain assembly and an electrified vehicle comprising the rotary electric machine.

BACKGROUND OF THE INVENTION

The trend towards designing and building fuel efficient, low emission vehicles has increased dramatically, this trend driven by concerns over the environment as well as increasing fuel costs. At the forefront of this trend has been the development of electrified vehicles, such as BEV, HEV, PHEV, Range extended EV, Fuel Cell etc., electrified vehicles that combine a relatively efficient combustion engine with an electric drive motor. Electrified vehicles can include components, particularly the rotary electric machine used in the power-train system, that needs appropriate cooling.

Therefore, it would be desirable if any improvements on the cooling design for the rotary electric machine used in the powertrain system for an electrified vehicle could be provided at least with simple configuration, high efficiency and low cost.

SUMMARY OF THE INVENTION

Aspects and advantages of the invention will be set forth in part in the following description, or may be obvious from the description, or may be learned through practice of the invention.

In accordance with one aspect disclosed herein, a rotary electric machine is provided. The rotary electric machine comprises a rotor configured for coupling with a rotary shaft and a stator configured for surrounding the rotor, the stator includes a stator body and stator end windings which extend from axial ends of the stator body. The rotary electric machine further comprises a housing configured for receiving the stator and rotor, the housing includes a fluid distributing chamber provided along an inner surface of the housing for being communicated with a plurality of fluid channels so as to distribute the fluid to flow through outer surfaces of the stator body and stator end windings when the stator is inserted into the housing.

In accordance with another aspect disclosed herein, a powertrain assembly comprising the rotary electric machine according to the above described is provided.

In accordance with another aspect disclosed herein, an electrified vehicle comprising the rotary electric machine according to the above described is provided.

These and other features, aspects, and advantages of the present disclosure will become better understood with reference to the following detailed description. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
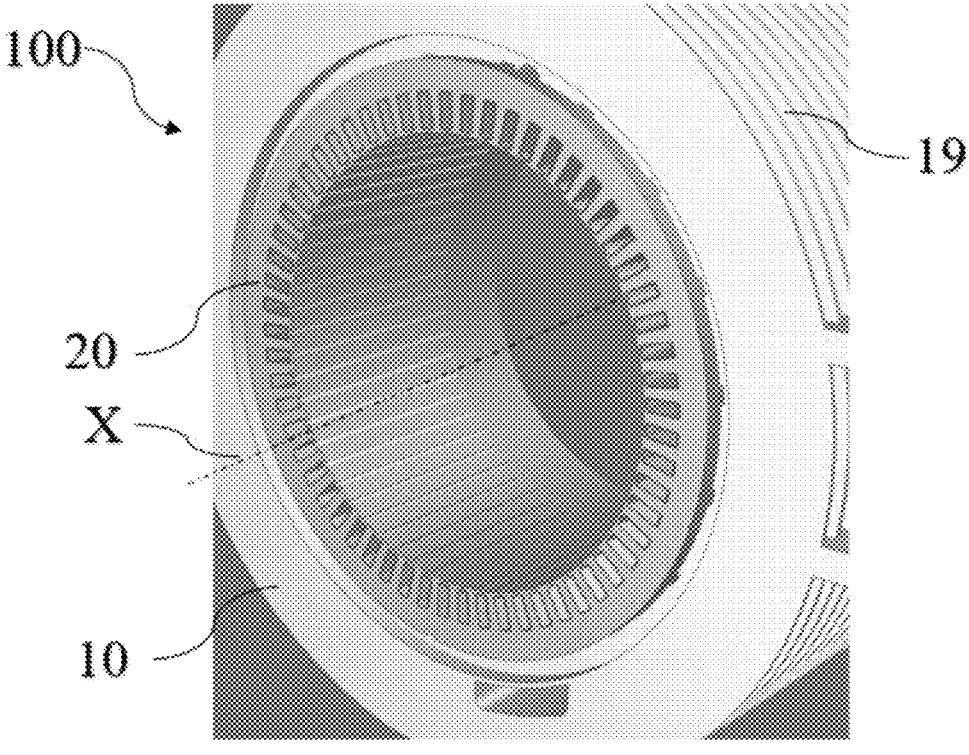
FIG. 1 is a schematic view of a rotary electric machine with a stator in accordance with an exemplary aspect of the present disclosure.

Reference will now be made to in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "a", "an" and "the" are intended to mean that there are one or more of the elements unless the context clearly dictates otherwise. The terms "comprising", "including" and "having" are intended to be inclusive and mean that there may be additional elements other than the listed elements. The terms "first" and "second" may be used interchangeably to distinguish one component from another and are not intended to signify location or importance of individual components.

Referring now to the drawings, wherein identical numerals indicate the same elements throughout the figures, FIG. 1 shows a rotary electric machine 100 in accordance with one embodiment of the present disclosure. The rotary electric machine 100 may be in the form of an alternator, an electric motor or a reversible electric machine that can operate in an alternator mode and in an electric motor mode. The rotary electric machine 100 comprises a stator 20 surrounding a rotor (not shown). The rotor may be coupling with a driving shaft (not shown) rotating around an axis X.

The rotary electric machine 100 further comprises a housing 10 for receiving the stator 20 and rotor, A plurality of cooling fins 19 are provided on the outer surface of the housing 10 for dissipating the heat towards the outside of the rotary electric machine 100. The cooling fins 19 allow to increase the outer surface of the housing 10 and thus promote the heat dissipation to the outside of the electric machine 100 via the housing 10. The entire outer surface of the housing 10 may carry cooling fins. The cooling fins may be arranged in rows, and a pitch, constant or not, may exist between two adjacent rows. Theses rows may or may or all have the same orientation. For the embodiment depicted, particularly, each of the cooling fins 19 are circumferentially arranged on the outer surface of the housing 10, and are basically parallel extending from the outer surface of the housing 10.

Figure 2:
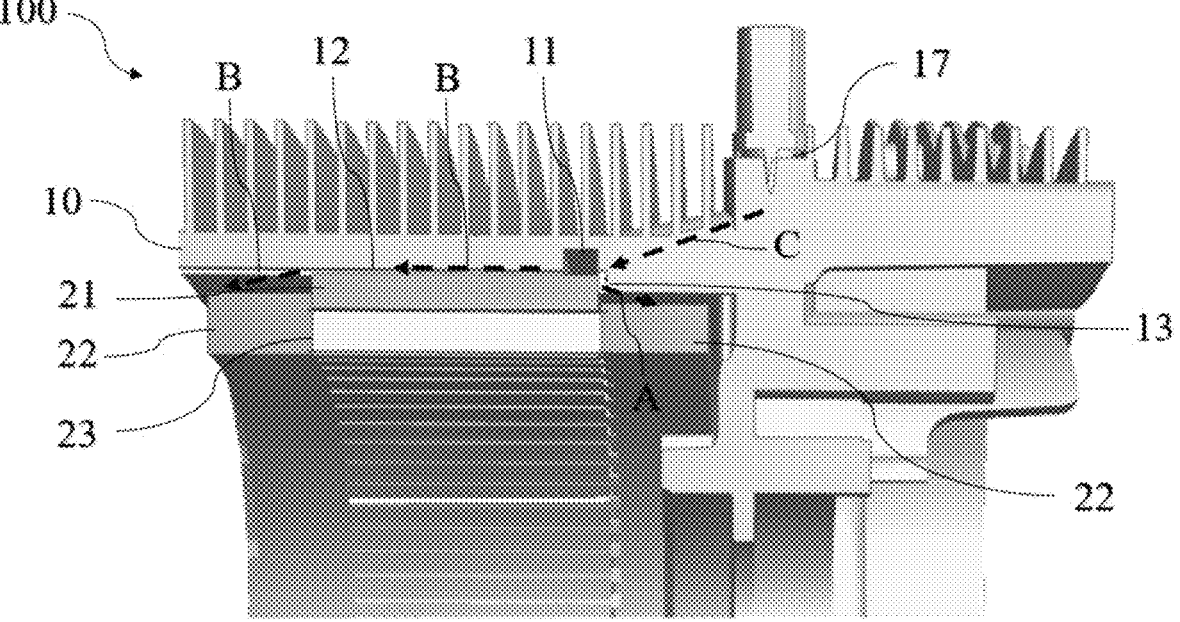
FIG. 2 is a schematic view of the rotary electric machine in accordance with an exemplary aspect of the present disclosure, generally showing one exemplary configuration of fluid distributing chamber and fluid channels between the housing and the stator.

Referring to FIG. 2, the stator 20 comprises a stator body 21 formed by a stack of iron sheets. The stator 20 further comprises end windings 22 extending from the axial ends 23 of the stator 20. Moreover, as can be seen in FIG. 2, the rotary electric machine 100 may be cooled by means of a cooling fluid whose flow paths are shown as arrows A, B and C between the housing 10 and the stator 20. The rotary electric machine 100 is configured such that cooling fluid entering the housing 10 through a single fluid inlet 17 is distributed for direct cooling of the stator 20. Direct cooling of the stator 20 results in lower operating temperatures and higher motor efficiency.

Still referring to FIG. 2, a fluid distributing chamber 11 is provided between an inner surface of the housing 10 and an outer surface of the stator 20, and in fluid communication with the single fluid inlet 17. A plurality of fluid channels 12, 13 are also provided between the inner surface of the housing 10 and the outer surface of the stator 20, and in fluid communication with the fluid distributing chamber 11. Thus, cooling fluid may flow into the fluid distributing chamber 11 from the single inlet 17 according to the flow path of arrow C, further into the fluid channels 12, 13 according to the flow paths of arrows A and B, so that the cooling fluid may flow through the entire outer surface of the stator 20.

Figure 3:
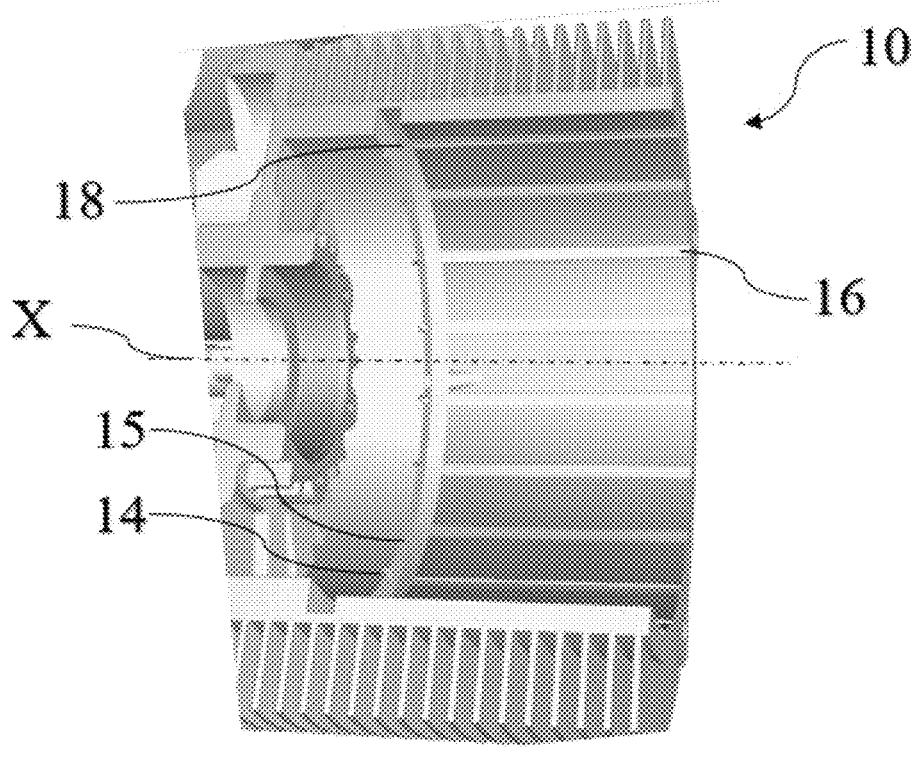
FIG. 3 is a schematic view of a housing of the rotary electric machine in accordance with an exemplary aspect of the present disclosure, showing one exemplary configuration of the annular groove, slots and recesses provided on the housing.
Figure 4:
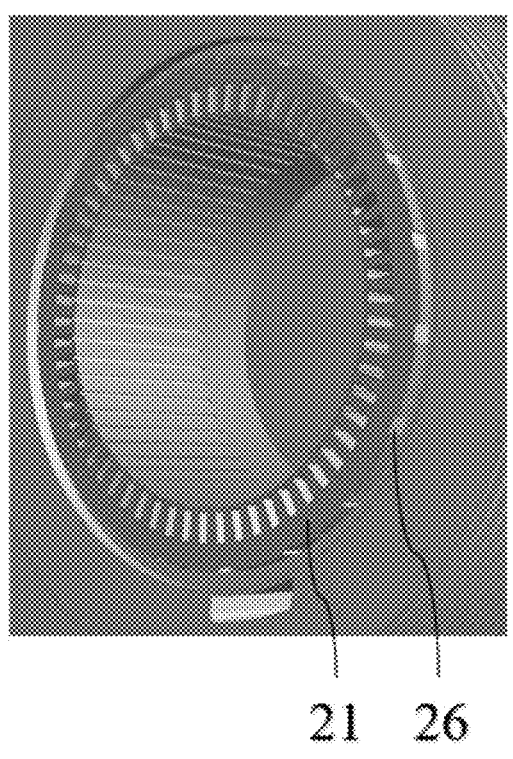
FIG. 4 is a schematic view of the rotary electric machine with a stator in accordance with another exemplary aspect of the present disclosure, showing one exemplary configuration of the recesses provided on the stator.

Referring to FIGS. 2, 3 and 4, the plurality of fluid channels comprise several axial cooling channels 12 which are formed by recesses 16, 26 arranged between the stator body 21 and the housing 10, so that cooling fluid may flow into such axial cooling channels 12 from the fluid distributing chamber 11 according to the flow path of arrows B. In one embodiment, the recesses 16 may be circumferentially spaced and provided onto the inner surface of the housing 10, as shown in FIG. 3. In one embodiment, the recesses 26 may be circumferentially spaced and provided onto the outer surface of the stator body 21, as show in FIG. 4. In one embodiment, the recesses may be arranged on both the inner surface of the housing 10 and the outer surface of the stator body 21. By means of these several axial cooling channels 12, cooling fluid from the fluid distributing chamber 11 may flow through the outer surface of the stator body 21 and one end winding 22 of the stator.

Referring to FIGS. 2 and 3, the plurality of fluid channels comprise another several axial cooling channels 13 which are formed by slots 14 provided on the housing 10 and by one outer surface of the stator 20, so that cooling fluid may flow into such another axial cooling channels 13 from the fluid distributing chamber 11 according to the flow path of arrow A which is opposite to the flow path of arrows B in the axial direction. By means of these another several axial cooling channels 13, cooling fluid also from the fluid distributing chamber 11 may flow to the other end winding 22 of the stator.

Still referring to FIGS. 2 and 3, the fluid distributing chamber 11 is disposed where the stator 20, especially the stator body 21, abuts against the housing 10 in the axial direction when the stator 20 is installed in the housing 10. The fluid distributing chamber 11 comprises a stopper surface 15 provided with the housing 10, the stopper surface 15 extends from the inner surface of the housing 10 towards to the axis X so as to limit the axial movement of the stator 20. The slots 14, forming the another several axial cooling channels 13 for directing the cooling fluid to flow to the other end winding 22 of the stator, are circumferentially spaced and provided by the edge of the stopper surface 15.

An annular groove 18 is provided with the inner surface of the housing 10 for surrounding the stator in a circumferential direction. The annular groove 18 forms one part of the fluid distributing chamber 11 and is in fluid communication with both the slots 14 and the recesses 16, 26. In one embodiment, the stopper surface 15 is one of the sides of the annular groove 18.

With the configuration as described above, the cooling circuit using a fluid distributing chamber 11 forming by the housing 10 and by the stator 20 will be automatically built in when the stator 20 is inserted into the housing 10, and the entire outer surface of the stator 20 could be directly cooled by the cooling fluid flowing through in such cooling circuit.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotary electric machine, comprising
   a rotor configured for coupling with a rotary shaft;
   a stator configured for surrounding the rotor, the stator comprising a stator body and stator end windings extending from axial ends of the stator body; and
   a housing configured for receiving the stator and rotor,
   wherein a fluid distributing chamber provided along an inner surface of the housing for being communicated with a plurality of fluid channels so as to distribute the fluid to flow through outer surfaces of the stator body and the stator end windings when the stator is inserted into the housing, the fluid distributing chamber being delimited by an annular groove on the inner surface of the housing surrounding the stator in a circumferential direction,
   wherein a first set of the plurality of fluid channels is formed by a first outer surface of the stator and by a plurality of slots circumferentially spaced and provided with the housing on a first axial side of the annular groove, the plurality of slots being configured for directing the fluid to flow through a first stator end winding via outlets of the plurality of slots,
   wherein a second set of the plurality of fluid channels is formed by a plurality of recesses arranged between the stator body and the housing, the plurality of recesses extending axially parallel to an axis of the rotary electric machine and being circumferentially spaced and provided onto at least one of the outer surface of stator body and the inner surface of the housing on a second axial side of the annular groove, the plurality of recesses being configured for directing the fluid to flow through a second stator end winding via outlets of the plurality of recesses, and
   wherein the outlets of the plurality of slots are radially inward of the outlets of the plurality of recesses.

2. The rotary electric machine according to claim 1, further comprising
   a single inlet provided with the housing, the single inlet being configured for introducing a fluid into the fluid distributing chamber.

3. A powertrain assembly, comprising the rotary electric machine according to claim 1.

4. An electrified vehicle, comprising the rotary electric machine according to claim 1.

5. The rotary electric machine according to claim 1, wherein the fluid distributing chamber is disposed where the stator abuts against the housing in an axial direction and is formed by one inner surface of the housing and by one outer surface of the stator.

6. A powertrain assembly, comprising the rotary electric machine according to claim 5.

7. An electrified vehicle, comprising the rotary electric machine according to claim 5.

8. The rotary electric machine according to claim 1, wherein the plurality of slots are arranged onto an edge of a stopper surface configured for limiting an axial movement of the stator.

9. A powertrain assembly, comprising the rotary electric machine according to claim 8.

10. An electrified vehicle, comprising the rotary electric machine according to claim 8.

11. The rotary electric machine according to claim 8, wherein the stopper surface is one side of the annular groove.

* * * * *